United States Patent Office 2,758,127
Patented Aug. 7, 1956

2,758,127

METHOD OF PREPARING SILICON ESTERS BY REACTING AN ALKOXYSILANOL WITH AN ALKOXYSILAMINE

Alfred Goldschmidt and James R. Wright, El Cerrito, Calif., assignors to California Research Corporation, San Francisco, Calif., a corporation of Delaware No Drawing. Application December 30, 1953, Serial No. 401,418

6 Claims. (Cl. 260—448.8)

This invention relates to a method for preparing silicon esters, and more particularly, alkoxy di-, tri-, and tetrasiloxanes.

The method heretofore employed in forming alkoxypolysiloxanes has been to react a polyalkoxychlorosilane either with water or with a polyalkoxysilanol in the presence of a suitable acid acceptor such as pyridine, the following equations being representative of the methods of preparation shown in the prior art:

(1)
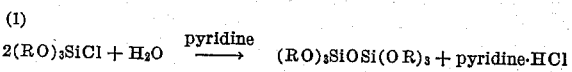

or, (2)
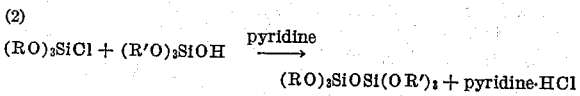

in the case of disiloxanes, and (3)
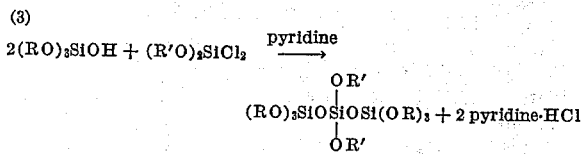

in the case of trisiloxanes, the R and R' representing the same or different alkyl groups.

The foregoing methods of preparation are unattractive from a commercial standpoint due to the fact that they require the use of an acid acceptor. The various compounds which are capable of performing the latter function, as, for example, pyridine, α-picoline and dimethylaniline, are expensive and must be recovered from the reaction mixture in order to reduce the cost of the preparation. However, this recovery step is not only expensive per se, but it also reduces the yield of the desired polysiloxane product due to the occlusion of said products by the acid acceptor salt which is normally separated from the reaction mixture in crystalline form. Further, organic bases such as pyridine and the like have unpleasant physical characteristics and their use presents a health hazard in some circumstances.

For the above and other reasons, it would be desirable if a method for preparing polysiloxanes were available which was relatively inexpensive and did not require the use of pyridine or any other type of acid acceptor compound, and it is the object of this invention to provide a method of this character.

The present invention is based on the discovery that polyalkoxy di-, tri- and tetrasiloxanes can readily be prepared by reacting an appropriate alkoxysilanol with an appropriate alkoxysilamine, the reaction proceeding at elevated temperatures with the evolution of ammonia.

The polysiloxanes which can be prepared by a practice of the present invention are those of the type having the general formula:

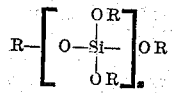

where the R's represent alkyl groups of from 3 to 12 carbon atoms each and $x$ is an integer having a value of 2, 3 or 4, at least three of said R's representing secondary or tertiary alkoxy groups.

As stated above, the present reaction is one which takes place at elevated temperatures between a silanol and a silamine. The silanol reactant is one of the type having the general formula

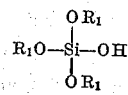

or

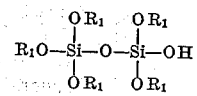

where the $R_1$'s, which can be the same as or different from one another, represent secondary or tertiary alkyl groups (including cycloalkyl radicals) of from 3 to 12, and preferably 4 to 8, carbon atoms each. Silanols of this character are well known in the art and can readily be prepared by reacting the corresponding monochlorosilane first with ammonia and then with water as described in detail in Example I below. Representative silanol reactants, any one of which can be employed in a practice of the present invention, include:

Triisopropoxysilanol
Tri(2-butoxy)silanol
Tert.butoxy di(2-butoxy)silanol
Tri-tert.butoxy silanol
Tri(4-methyl-2-pentoxy)silanol
Tri(2-heptoxy)silanol
Tri(2-octoxy)silanol
Tert.-pentoxy di(2-octoxy)silanol
Tri(3-decoxy)silanol
Tri(cyclohexoxy)silanol
Tri(4-methylcyclohexoxy)silanol
Tri(5-ethyl-2-nonoxy)silanol
Tri(2-dodecoxy)silanol
Tri(2-butoxy)siloxy-di(2-butoxy)silanol
Triisopropylsiloxy-diisopropylsilanol
Tri(2-heptoxy)siloxy-di(2-heptoxy)silanol The silamine reactants which can be employed in the present process are those of the type having one or the other of the following general formulae:

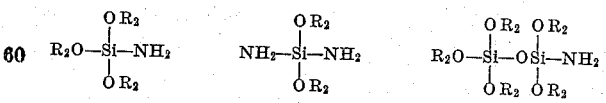

where the $R_2$'s, which can be the same as or different from one another, represent primary, secondary or tertiary alkyl groups, including cycloalkyl, of from 3 to 12 carbon atoms, and preferably of from 4 to 8 carbon atoms, each. These compounds can be prepared by well known methods, perhaps the most convenient of which is by reaction of the corresponding mono- or dichlorosilane with ammonia as illustrated in Example I below. Representative silamine reactants for use in the present invention are:

Triisopropoxysilamine
Tri(2-methylbutoxy)silamine
Tri-tert.butylsilamine
Tri-tert.amoxysilamine
Tri(2-ethylhexoxy)siloxy-di(2-ethylhexoxy)silamine
Tributoxysilamine
Tripentoxysiloxy-dipentoxysilamine
Tri(2-ethylbutoxy)silamine
Tri(5-ethyl-2-nonoxy)silamine
Tri(2-ethylhexoxy)silamine
Tri(3-methyl-2-butoxy)silamine
Tri(2-butoxy)siloxy-ditert.butylsilamine
Tricyclohexoxysilamine
Tricyclopentoxysilamine
Tri(4-methylcyclohexoxy)silamine
Di(2-butoxy)diaminosilane
Di-tert.amoxy-diaminosilane
Dicyclohexoxy-diaminosilane
Di(2-ethylhexoxy)-diaminosilane
Tri(2,4-dimethylpentyl)silamine
Tri(1-isopropyl-2-methyl)silamine The selection of the particular silanol and silamine reactants to be employed will, of course, be governed by the nature of the product desired. Thus, hexaalkoxy-disiloxanes will normally be prepared by reacting approximately equimolar proportions of a trialkoxysilanol and a trialkoxysilamine, the reaction proceeding in accordance with the following general equation:

(4)
$$(R_1O)_3\text{—Si—OH} + (R_2O)_3\text{SiNH}_2 \longrightarrow (R_1O)_3\text{Si—O—Si}(OR_2)_3 + NH_3$$

wherein the R₁'s and R₂'s represent alkyl groups of the type defined above.

In preparing trisiloxanes, any one of the pairs of silanol and silamine reactants can be employed as indicated in the following equations:

(5)
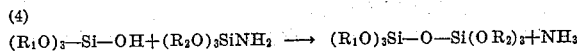

(6)
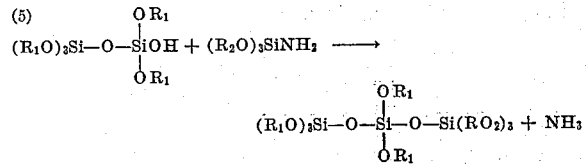

(7)
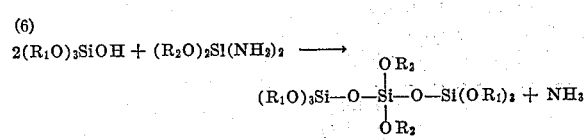

Again, the following alternatives are available in selecting appropriate reactants by which to produce the desired tetrasiloxanes:

(8)
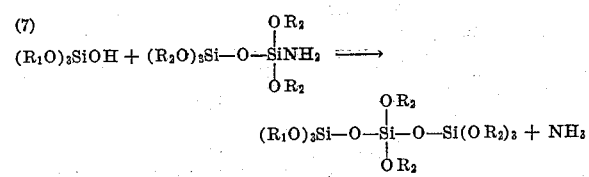

(9)
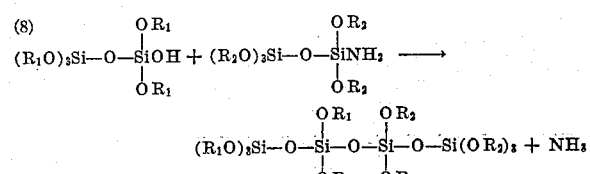

(10)
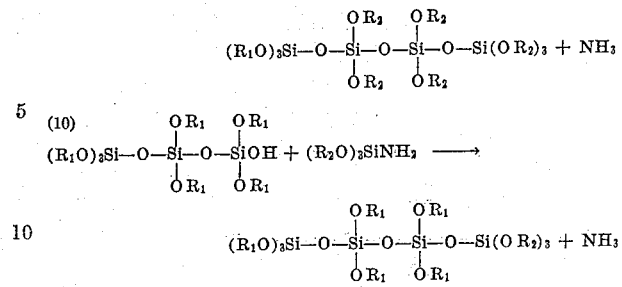

The process of the present invention is most efficiently carried out by mixing the respective silamine and silanol reactants with one another in the theoretically required proportions as indicated in Equations (4)–(10) above. However, either of the reactants can be present in excess if desired. The reaction goes forward at elevated temperatures above about 100° F., and preferably at temperatures between 200 and 400° F. The pressure in the reaction zone is not critical. Since the respective silamine and silanol reactants are liquids at the indicated reaction temperatures, it is not necessary to employ any inert solvent media, though a suitable high-boiling liquid of this character can be used if desired. The reaction proceeds in the absence of any catalyst, and substantial conversions of the desired polysiloxane product are obtained in reaction intervals as short as 0.5 to 1 hour. However, maximum yields are obtained when reaction periods of about 5 to 20 hours are obtained, particularly when nitrogen or other inert gas is bubbled through the mixture as the reaction progresses in order to carry out the ammonia released during the reaction. Some increase in the reaction rate can be obtained with the use of a catalyst, particularly a basic material. However, it is preferred to conduct the reaction in the absence of any catalyst so as to simplify the product recovery and other steps in the over-all process. Once the reaction is substantially complete, as evidenced by a reduction or cessation in the evolution of ammonia from the reaction mixture, the reaction can be terminated and the polysiloxane product recovered, preferably by fractional distillation under reduced pressure. Any unreacted silanol and silamine components of the final reaction mixture can also be recovered in the same fashion.

The polysiloxanes prepared by a practice of this invention have particular utility as hydraulic fluids and as lubricants in systems which are subjected to extreme temperature conditions. In many cases it has been found that the liquid reaction mixtures obtained by the reaction of appropriate silanol and silamine compounds in accordance with the present process make excellent hydraulic and lubricant fluids. Accordingly, where this is the case it is not necessary to practice the step whereby the polysiloxane product is separated from the other components of the reaction mixture.

The process of the present invention is illustrated in various of its embodiments by the following examples.

*Example I*

This example relates to the preparation of hexa(2-butoxy) disiloxane by the reaction of tri(2-butoxy)silamine and tri(2-butoxy) silanol. These reactants were prepared as follows: A 2-liter flask equipped with stirrer, dropping funnel and reflux condenser was charged with 3 moles (510 grams) of SiCl₄. An ice-NaCl bath was supplied keeping the temperature of the reaction unit throughout the operation at about 23° F. 9 moles (666 grams) of 2-butanol were then added over a 2-hour period, after which the cooling bath was removed and nitrogen bubbled through the liquid. The HCl present therein was removed. The reaction mixture was then distilled under vacuo and the tri(2-butoxy)chlorosilane was recovered in the amount of 2.6 moles (730 grams) as the fraction boiling between about 167 and 172.5°

F. at 2 mm./Hg. Of the product so recovered, 1.2 moles (339 grams) was then charged to a 3-liter flask equipped with stirrer and reflux condenser along with 800 cc. of n-hexane. Ammonia was then passed through the mixture for 4 hours, the temperature rising to about 113° F. with the addition of ammonia and no cooling of the reaction mixture being required. The end of the reaction is signalled by a sudden drop in temperature. The reaction mixture was then allowed to stand and thus permit the salt present to settle to the bottom of the reaction flask. The liquid phase was then decanted and fractionated under vacuo. The desired tri(2-butoxy)-silamine reactant was recovered in 87% yield as the fraction boiling between 194 and 199.5° F. at 3 mm./Hg. The tri(2-butoxy)silanol reactant was prepared by a practice of the same steps as employed in preparing the silamine reactant. However, instead of distilling off the silamine reactant from the decanted liquid, this liquid was combined with an excess of water after which the mixture was stirred for one hour. The aqueous phase was then separated and the desired oil layer was washed with water. The washed product was then dried over anhydrous $Na_2SO_4$, after which the hexane solvent was removed under reduced pressure and the tri(2-butoxy)-silanol recovered in an essentially quantitative yield as the fraction boiling between 196 and 199.5° F. at 3.5 mm./Hg.

The hexa(2-butoxy)disiloxane is now prepared by charging 80 grams of the tri(2-butoxy)silamine and 80 grams of tri(2-butoxy)silanol to a 500 cc. flask equipped with a nitrogen inlet and a reflux condenser, heating the reaction mixture at about 300 to 320° F. for 12 hours while passing through the vessel a brisk current of nitrogen. Fractionation of the resulting reaction product yields a forerun of unconverted reactants and 55.5 grams of a liquid boiling at 294-296° F. at 1.5 mm./Hg. This liquid, which was found to be the desired hexa (2-butoxy)-disiloxane product, had a refractive index, $n_D^{20}$ of 1.433, viscosities of 7.38 cs. and 3.11 cs. at 100° F. and 210° F., respectively, and an ASTM slope of 0.51. The conversion to the disiloxane in this preparation was 36%.

*Example II*

In this operation 2 moles of tri(2-butoxy)silanol are combined with 1 mole of di(tert.pentoxy) diaminosilane in a suitable reaction vessel, after which the mixture is heated at a temperature of about 350° F. for 8 hours as a current of nitrogen is continuously passed through the mixture. Upon subjecting the resulting reaction product to distillation in vacuo, the desired trisiloxane product di[tri(2-butoxy)siloxy] di[tert.pentoxy]silane is recovered (in the amount of approximately 0.4 moles) as the fraction boiling at about 370-375° F. at 1 mm./Hg.

*Example III*

This example relates to the preparation of the tetrasiloxane compound known as 1,3-bis[tri(2-butoxy)-siloxy]tetra(2-butoxy)disiloxane, and having the structural formula

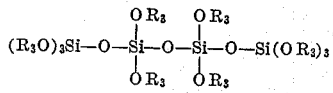

where the $R_3$'s represent 2-butyl groups. This compound is prepared by combining substantially equimolar amounts of tri(2-butoxy)siloxy-di(2-butoxy)silanol and tri(2-butoxy)siloxy-di(2-butoxy)silamine, with the resulting reaction mixture being heated at a temperature of approximately 340-360° F. for a period of 12½ hours. During this reaction period the mixture is continuously agitated by bubbling nitrogen therethrough. Upon subjecting the resulting mixture to distillation in vacuo there is recovered the desired tetrasiloxane product in a yield of approximately 60% as the fraction boiling at about 475-485° F. at 1 mm./Hg.

In the above examples the method described is one wherein the silanol and silamine reactants are separately prepared and then combined with heating to provide the desired polysiloxane product. However, instead of preparing the silanol reactant separately, one may start with the silamine reactant and add the proportion of water required to convert the desired proportion of said silamine to the corresponding silanol compound. This reaction is well known, and is set forth in detail in Example I above; while an excess of water was employed in that example, it is possible to give the desired conversion of the amine compound to the corresponding silanol compound by adding only the theoretically required proportion of water. Thus, in Example III above, instead of separately preparing the disiloxanol and disiloxamine reactants one may start with the corresponding chlorosilane product, here tri(2-butoxy)siloxy-di(2-butoxy)chlorosilane, this compound first being reacted with ammonia to form the corresponding amine product tri(2-butoxy)siloxy-di(2-butoxy)silamine, after which this reaction mixture as a whole may be treated with water to convert the desired proportion of the silamine to the corresponding silanol reactant. Thus, in this particular case good results are obtained by converting approximately ½ of the silamine, thereby giving a reaction mixture containing equimolar amounts of the respective silamine and silanol reactants. Heating of this mixture thereafter causes the reactants to combine with the formation of the desired tetrasiloxane product with the corresponding elimination of ammonia.

We claim:

1. The method of preparing alkoxypolysiloxanes which comprises bringing a silanol selected from the group consisting of those having the general formulae

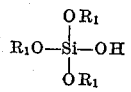

and

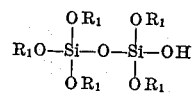

into reactive engagement at a temperature between 200 and 400° F. for a period of at least one-half hour with a silamine selected from the group consisting of those having the general formulae

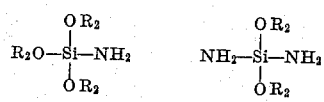

and

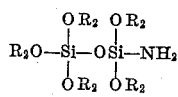

the $R_1$'s in said formulae representing radicals selected from the group consisting of secondary and tertiary alkyl radicals of from 3 to 12 carbon atoms each, and the $R_2$'s representing radicals selected from the group consisting of primary, secondary and tertiary alkyl groups of from 3 to 12 carbon atoms each.

2. The method of preparing a disiloxane which comprises bringing a trialkoxysilanol of the type having the general formula

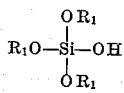

into reactive engagement at a temperature between 200 and 400° F. for a period of at least one-half hour with a trialkoxysilamine having the general formula

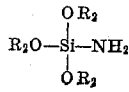

the $R_1$'s and the $R_2$'s representing radicals selected from the group consisting of secondary and tertiary alkyl groups of from 4 to 8 carbon atoms each.

3. The method of claim 2 wherein the reactants are employed in substantially equimolar proportions and wherein a reaction period of at least five hours is employed.

4. The method of preparing trisiloxanes which comprises bringing a silanol reactant of the type having the general formula

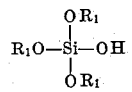

into reactive engagement at a temperature between 200 and 400° F. for a period of at least one-half hour with a silamine of the type having the general formula

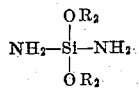

where the $R_1$'s and the $R_2$'s are selected from the group consisting of secondary and tertiary alkyl groups of from 4 to 8 carbon atoms each.

5. The method of preparing trisiloxanes which comprises bringing a silanol reactant of the type having the general formula

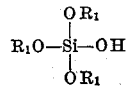

into reactive engagement at a temperature between 200 and 400° F. for a period of at least one-half hour with a silamine of the type having the general formula

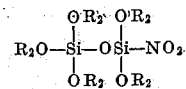

where the $R_1$'s and the $R_2$'s are selected from the group consisting of secondary and tertiary alkyl groups of from 4 to 8 carbon atoms each.

6. The method of preparing hexa(2-butoxy)disiloxane which comprises reacting tri(2-butoxy)silamine and tri(2-butoxy) silanol in substantially equimolar proportions, and at a temperature between 200 and 400° F. for a period of from 5 to 20 hours, and thereafter distilling the hexa(2-butoxy)disiloxane from the resulting reaction mixture.

References Cited in the file of this patent

UNITED STATES PATENTS 2,684,379    Guillissen    July 20, 1954

OTHER REFERENCES

Miner et al. "Ind. and Eng. Chem.," vol. 39 (1947), pages 1368–1371.

Rochow "Chemistry of the Silicones," 2d Ed. (1952), pp. 51–53, Wiley and Sons, publishers, New York.